United States Patent
Omura

(10) Patent No.: US 11,191,258 B2
(45) Date of Patent: Dec. 7, 2021

(54) FISHING LINE GUIDE AND FISHING ROD INCLUDING SAME

(71) Applicant: FUJI KOGYO CO., LTD., Shizuoka (JP)

(72) Inventor: Kazuhito Omura, Shizuoka (JP)

(73) Assignee: FUJI KOGYO CO., LTD., Shizuoka (JP)

( * ) Notice: Subject to any disclaimer, the term of this patent is extended or adjusted under 35 U.S.C. 154(b) by 243 days.

(21) Appl. No.: 16/507,080

(22) Filed: Jul. 10, 2019

(65) Prior Publication Data

US 2020/0037589 A1  Feb. 6, 2020

(30) Foreign Application Priority Data

Aug. 3, 2018  (KR) .................... 10-2018-0090693
Dec. 21, 2018  (KR) .................... 10-2018-0167813

(51) Int. Cl.
*A01K 87/04* (2006.01)
*A01K 87/02* (2006.01)

(52) U.S. Cl.
CPC .............. *A01K 87/04* (2013.01); *A01K 87/02* (2013.01)

(58) Field of Classification Search
CPC ........ A01K 87/04; A01K 87/02; A01K 87/00; A01K 87/002; A01K 89/00; A01K 91/00; A01K 97/10
USPC ........................................ 43/24, 18.5, 18.1 R
See application file for complete search history.

(56) References Cited

U.S. PATENT DOCUMENTS

| 3,760,524 | A  | * | 9/1973  | Butler, Jr. ............. | A01K 87/04 43/24 |
| 3,769,735 | A  | * | 11/1973 | Cousin .................. | A01K 87/04 43/24 |
| 4,507,891 | A  |   | 4/1985  | Ohmura | |
| 6,154,998 | A  |   | 12/2000 | Hashimoto et al. | |
| 6,219,954 | B1 |   | 4/2001  | Ohmura | |
| 10,149,465 | B2 |   | 12/2018 | Omura | |
| 2005/0172535 | A1 |   | 8/2005  | Lee | |
| 2006/0283073 | A1 | * | 12/2006 | Omura .................. | A01K 87/04 43/24 |
| 2008/0005953 | A1 |   | 1/2008  | Anderson | |

(Continued)

FOREIGN PATENT DOCUMENTS

| CN | 202184058 U | 4/2012 |
| CN | 106455532 A | 2/2017 |
| CN | 107734966 A | 2/2018 |

(Continued)

OTHER PUBLICATIONS

Combined Chinese Office Action and Search Report dated Apr. 27, 2021 in Chinese Patent Application No. 201910699367.X (with English translation), 19 pages.

*Primary Examiner* — Darren W Ark
*Assistant Examiner* — Katelyn T Truong
(74) *Attorney, Agent, or Firm* — Oblon, McClelland, Maier & Neustadt, L.L.P.

(57) ABSTRACT

According to an embodiment, there is provided a fishing line guide including a ring portion through which a fishing line passes and an attachment foot extending from the ring portion and attached to a fishing rod. The attachment foot may have stepped portions each formed on each of two side portions in a cross section of the attachment foot in a width direction of the attachment foot orthogonal to a longitudinal direction of the attachment foot.

8 Claims, 24 Drawing Sheets

(56) References Cited

U.S. PATENT DOCUMENTS

2016/0088821 A1    3/2016   Omura
2018/0168137 A1    6/2018   Omura

FOREIGN PATENT DOCUMENTS

| | | | |
|---|---|---|---|
| JP | 8-332003 | A | 12/1996 |
| JP | 2000-236783 | A | 9/2000 |
| JP | 2003-284455 | | 10/2003 |
| JP | 2004-57061 | | 2/2004 |
| JP | 2010-148523 | | 7/2010 |
| JP | 4652136 | | 3/2011 |
| JP | 5339539 | B2 * | 11/2013 |
| JP | 5460544 | B2 * | 4/2014 |
| JP | 5919448 | | 5/2016 |
| JP | 2017-85916 | | 5/2017 |
| JP | 2017-205063 | A | 11/2017 |
| JP | 6527057 | B2 * | 6/2019 |
| JP | 6553455 | B2 * | 7/2019 |
| JP | 6760761 | B2 * | 9/2020 |
| KR | 10-2000-0034915 | | 6/2000 |
| KR | 10-1391116 | | 4/2014 |
| KR | 10-1696158 | | 1/2017 |
| TW | 200642589 | A | 12/2006 |
| WO | WO-2007094105 | A1 * | 8/2007 ............. A01K 87/04 |
| WO | WO-2020004634 | A1 * | 1/2020 ............. A01K 87/04 |

\* cited by examiner

← Butt  Tip →

1000

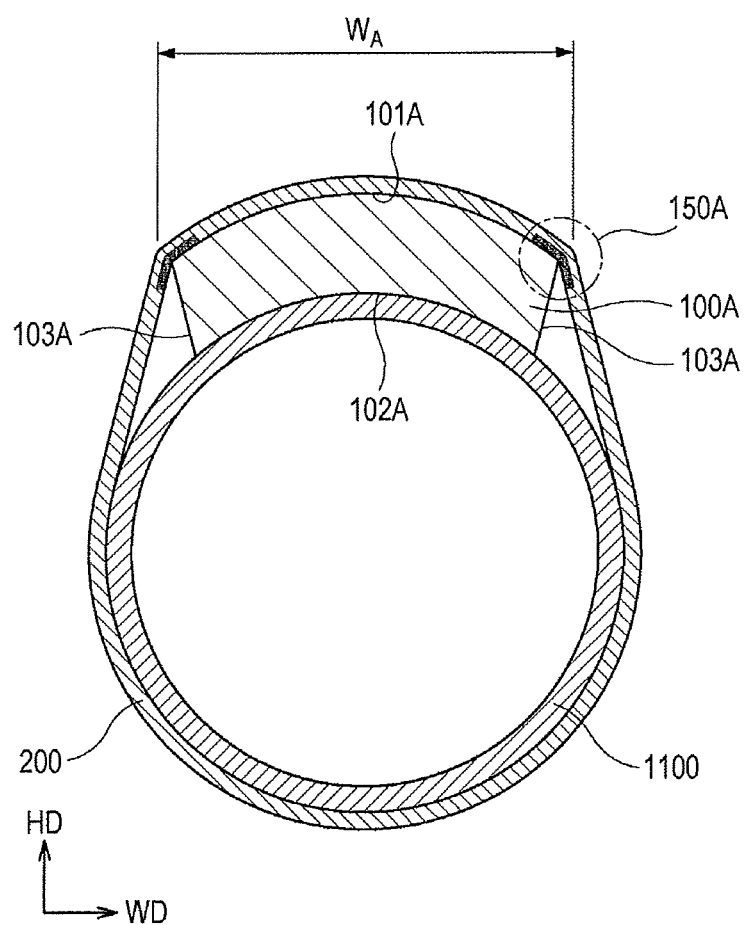

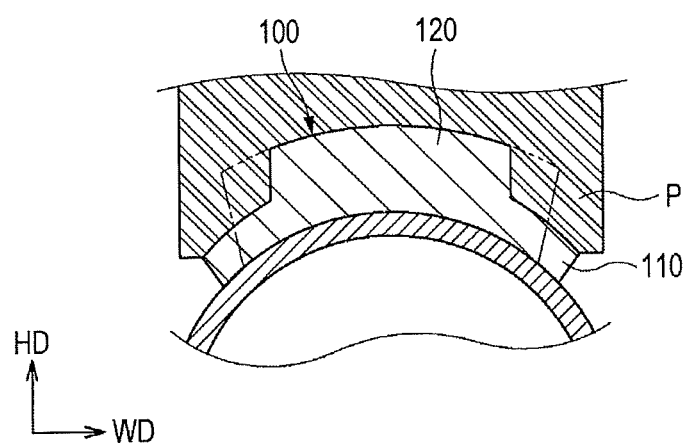

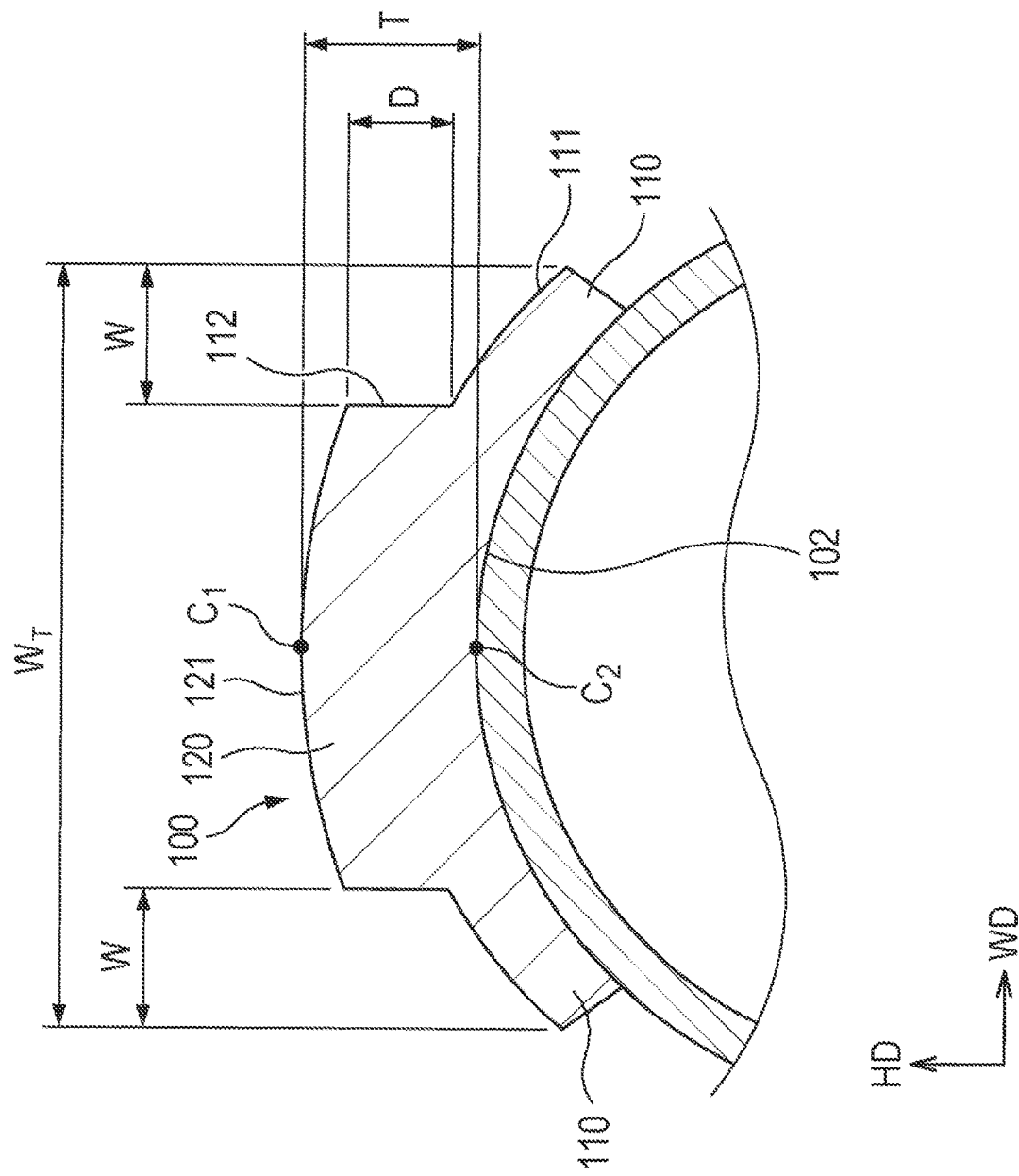

FIG. 10

| Indented Depth(D) \ Total Indented Width(2W) | 30% | 45% | 60% |
|---|---|---|---|
| 10% | 100.2% | 100.8% | 100.4% |
| 20% | 100.7% | 101.3% | 100.9% |
| 30% | 101.1% | 101.7% | 101.3% |
| 40% | 102.3% | 102.9% | 102.5% |
| 50% | 103.5% | (104.1%) | 103.7% |
| 60% | 103.7% | 104.3% | 103.7% |
| 70% | 103.7% | 104.4% | 103.9% |

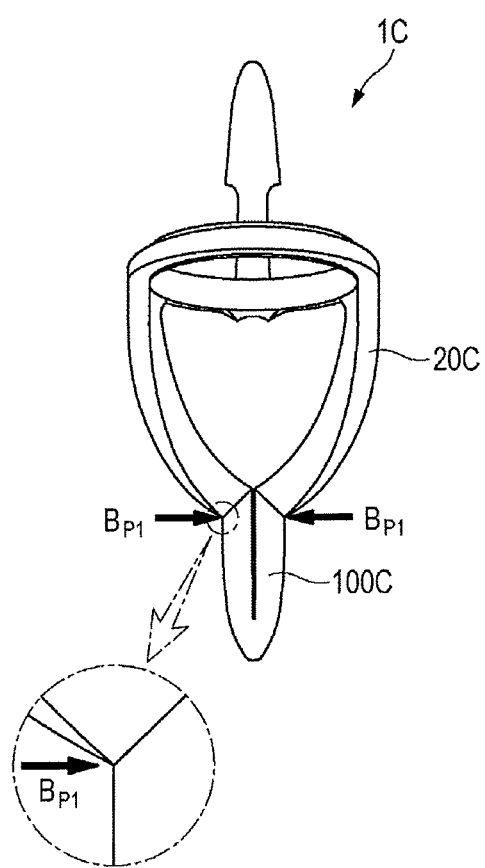

| | Comparative Example | Embodiment |
|---|---|---|
| Test Piece | 181A, 180A, 100A, TPA | 181, 180, 100, TP1, 110 |
| Stepped Portion | | 2W = 45%<br>D = 50% |
| Extraction Force | 269.97 (N) | 295.02 (N) |
| Ratio | 100% | 109.28% (9.28%) |

FISHING LINE GUIDE AND FISHING ROD INCLUDING SAME

CROSS-REFERENCE TO RELATED APPLICATION

This application is based upon and claims the benefit of priorities from Korean Patent Application No. 10-2018-0090693, filed on Aug. 3, 2018, and Korean Patent Application No. 10-2018-0167813, filed on Dec. 21, 2018, the entire contents of which are incorporated herein by reference.

TECHNICAL FIELD

The present disclosure relates to a fishing line guide configured to guide a fishing line and attached to a fishing rod, and a fishing rod including the same.

BACKGROUND

Fishing line guides configured to guide a fishing line in a fishing rod include thread-wound guides fixed to a fishing rod by a winding thread (which may also be referred to as a "thread" hereinafter). These thread-wound guides are attached to the fishing rod at a plurality of appropriate positions depending on the length of the fishing rod.

In order to fully withstand the load applied in the forward and rearward, leftward and rightward, upward and downward, and torsional directions through the fishing line when casting a fishing rig or landing a fish, the thread-wound guides may be fixed to the fishing rod thread-wound guide attachment feet using an adhesive such as epoxy after tightly winding threads around the thread-wound guides together with the fishing rod. In addition, the attachment feet themselves are designed to have a width and a thickness that provide a required strength such that deformation or breakage is not caused due to a load.

As an example of a fishing line guide, Japanese Patent Publication No. 4652136 (Patent Document 1) discloses a fishing line guide having two attachment feet. According to Patent Document 1, the two attachment feet are located on the fishing rod butt side and the fishing rod tip side, respectively, and a pair of side support legs extend from the left and right side portions of the rear end of a ring part towards a fishing rod located at the lower side to the fishing rod butt side. The fishing rod butt side attachment foot transits in a tapered form from the front ends of the pair of side support legs to the fishing rod butt side in the form of a tongue, and abuts a tubular rod in the state of being oriented substantially horizontally with respect to a rod body of the fishing rod. In order to allow a thread to be easily wound, the fishing rod butt side attachment foot is tapered at the fishing rod butt side, but the width and thickness thereof are enlarged towards the pair of support legs in order to provide a required strength.

As an example of a fishing line guide, Japanese Patent Publication No. 5919448 (Patent Document 2) discloses a fishing line guide having a reinforcement groove formed in the lower surface of an attachment foot. According to Patent Document 2, the reinforcement groove is formed in the lower surface of the attachment foot and extends in the longitudinal direction of the attachment foot. The reinforcement groove is located in the portion of the attachment foot to which load is concentrated, and the portion of the attachment foot to which load is concentrated is work-hardened and is resistant against plastic deformation. The upper surface of the attachment foot on the side, on which the reinforcement groove is not provided, has a tapered shape on the fishing rod butt side in order to allow the thread to be wound easier as in Patent Document 1. However, like the fishing rod butt side attachment foot in Patent Document 1, the width and the thickness are enlarged towards the pair of support legs in order to provide the necessary strength.

SUMMARY

Since a thread-wound guide is fixed using an adhesive such as epoxy after a thread is wound around the thread-wound guide and the fishing rod, the winding state of the thread and bonding state of the adhesive with little deviation or unevenness become important in the aesthetic property of the fishing rod. Further, the thread is excellent in view of smooth appearance when the thread is wound in a substantially columnar shape like the circumferential shape of the fishing rod. In order to wind the thread in a substantially cylindrical shape, it is preferable that the attachment foot of the thread-wound guide be formed in a shape that does not cause bulkiness. It can be said that the shape of the attachment foot is preferably narrow in width and thin in thickness.

Meanwhile, since the design of the attachment foot is made such that the attachment has a width and a thickness providing a strength required so as not to cause deformation or breakage due to load, simply making the width and the thickness of the attachment foot narrow and thin in consideration of the smooth appearance of the winding of the thread becomes a very difficult problem in view of strength design.

In the case of an adhesive such as epoxy, boding is performed such that the adhesive is thinly applied in order to reduce deviation or unevenness. However, when the adhesive is thinly applied, it affects the bonding force, causing the adhesive to be whitened or cracked due to the repeated expansion and contraction thereof due to the warping of the fishing rod, and the aesthetic property of the fishing rod may be seriously damaged.

The present disclosure has been made in order to solve a problem of making the above-mentioned aesthetic property and strength compatible in consideration of a shape design. The present disclosure provides a fishing line guide and a fishing rod including the same, in which a winding thread, which fixes a fishing line guide, is capable of being wound around the fishing rod in a substantially columnar shape such that the aesthetic property of the fishing rod is not damaged, and in which the fishing line guide is prevented from being deformed or broken by load applied in the forward and rearward, leftward and rightward, upward and downward, and torsional directions through the fishing line when casting the fishing rig or landing a fish, and a bonding force of the adhesive such as epoxy, which fixes the fishing line guide, is improved without damaging the appearance of the fishing line guide.

According to an embodiment, a fishing line guide includes a ring portion through which a fishing line passes and an attachment foot extending from the ring portion and attached to a fishing rod, in which the attachment foot may have stepped portions each formed on each of two side portions in a cross section of the attachment foot in a width direction of the attachment foot orthogonal to a longitudinal direction of the attachment foot. The stepped portions may have a first height that is lower than a second height of a central portion of the attachment foot with reference to a height direction of the cross section of the attachment foot in the width direction. The central portion of the attachment foot has side surfaces that are parallel to the height direction of the cross section of the attachment foot in the width direction.

According to an embodiment, each of the stepped portions has a width that is 15 to 22.5% of the total width of the attachment foot with reference to the width direction.

According to an embodiment, the stepped portions have a depth that may be 30 to 50% of a thickness of a central portion of the attachment foot at a center position in the width direction with reference to a height direction of the cross section of the attachment foot in the width direction.

According to an embodiment, the fishing line guide may further include a support leg, which connects the ring portion and the attachment foot, and the attachment foot may be made of a metal material.

According to an embodiment, the stepped portions may be formed to extend in the width direction by an indenting process that presses the upper surface portion of the attachment foot in the height direction of the cross section of the attachment foot in the width direction in the state in which the lower surface portion of the attachment foot is supported.

A fishing rod according to an embodiment of the present disclosure may include a fishing line guide, a tubular rod to which the fishing line guide is attached, a winding thread configured to wound around an attachment foot of the fishing line guide and an outer peripheral portion of the tubular rod adjacent to the attachment foot, and an adhesive applied and hardened on the winding thread.

According to an embodiment, a first end of each of the stepped portions may be formed at a position adjacent to a front end of the attachment foot, and a second end of each of the stepped portions is formed at a position adjacent to a rear end of the attachment foot, and the winding thread may be configured to be wound from the outer peripheral portion of the tubular rod located behind the front end of the attachment foot to the second end of each of the stepped portions.

According to an embodiment, an angle between a line connecting a first edge of the central portion of the attachment foot at a first side portion of the two side portions and a second edge of each of the stepped portions at the first side portion and the width direction is in a range of 110 degrees to 150 degrees.

According to an embodiment, a space between a portion of the winding thread, which connects a first edge of the central portion of the attachment foot at a first side portion of the two side portions and a second edge of the stepped portions at the first side portion, and an upper surface of the stepped portion at the first side portion may be filled with the adhesive.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 3A is a cross-sectional view illustrating a fishing line guide according to a comparative example in the state of being installed on a tubular rod.

FIGS. 8A to 8C are process views illustrating a process of forming stepped portions on an attachment foot of a fishing line guide according to an embodiment of the present disclosure.

FIG. 9 is a cross-sectional view for explaining the detailed configuration of an attachment foot of a fishing line guide according to an embodiment of the present disclosure.

FIG. 10 shows test data for explaining an improvement rate in the strength of an attachment foot after an indenting process is performed on the attachment foot.

FIGS. 12A and 12B are views for explaining a boundary from which a fishing line guide attachment foot according to a comparative example starts.

DETAILED DESCRIPTION

Figure 1:
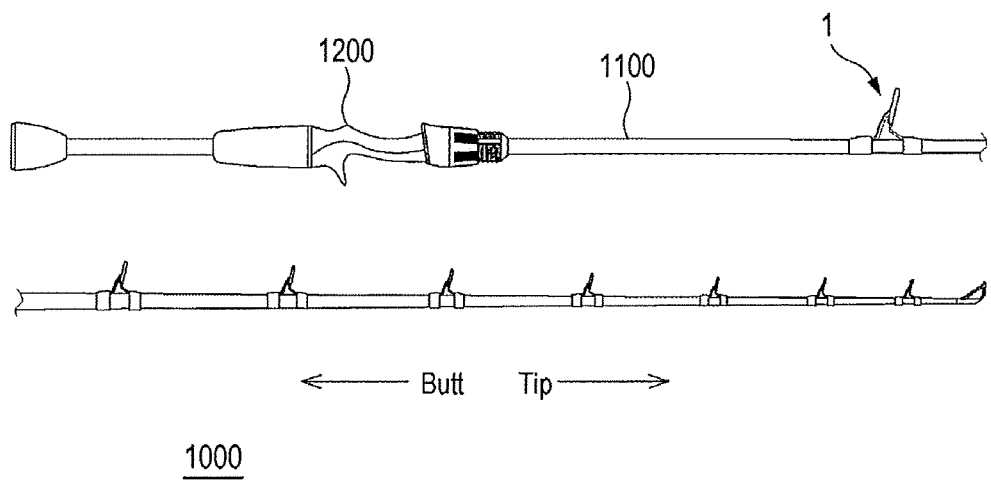
FIG. 1 is a side view illustrating a fishing rod according to an embodiment of the present disclosure.

Embodiments of the present disclosure are illustrated for the purpose of explaining the technical idea of the present disclosure. The scope of the rights according to the present disclosure is not limited to the embodiments presented below or the detailed descriptions of such embodiments.

All the technical terms and scientific terms in the present disclosure include meanings or definitions that are commonly understood by those of ordinary skill in the art unless otherwise defined. All terms in the present disclosure are selected for the purpose of describing the present disclosure more clearly, and are not selected to limit the scope of the present disclosure.

As used in the present disclosure, expressions such as "comprising", "including", "having", and the like are to be understood as open-ended terms having the possibility of encompassing other embodiments, unless otherwise mentioned in the phrase or sentence containing such expressions.

The singular expressions that are described in the present disclosure may encompass plural expressions unless otherwise stated, which will be also applied to the singular expressions recited in the claims.

The expressions, such as "first," "second," etc., which are shown in various embodiments of the present disclosure, are used to separate a plurality of elements from each other, and are not intended to limit an order or importance of the corresponding elements.

In the present disclosure, the description that one element is "connected," or "coupled" to another element should be appreciated to indicate that one element may be directly connected, or coupled, to another element, and should be further understood that a new element may be interposed between one element and another element.

As used in this disclosure, the direction indication term "front side" refers to the direction in which a fishing rod tip is positioned relative to a fishing rod butt in the accompanying drawings, and the direction indication terms such as "rear side" and "rear" mean a direction opposite the front side. The fishing rod illustrated in the accompanying drawings may be differently oriented, and the direction indication terms may be interpreted accordingly.

In the coordinate systems illustrated in the drawings of the present disclosure, a longitudinal direction LD, a width direction WD, and a height direction HD are indicated. The longitudinal direction LD means a direction in which a fishing rod and a tubular rod extend or a direction in which the attachment feet of the fishing line guide are installed thereon extends. The width direction WD is a direction perpendicular to the longitudinal direction LD, and means a direction indicating the width of the attachment foot. The height direction HD is a direction perpendicular to both the longitudinal direction LD and the width direction WD and indicates the height of the fishing line guide or the height of the attachment foot.

Hereinafter, the embodiments of the present disclosure will be described in detail with reference to the accompanying drawings. The same reference numeral will be used for the same element throughout the drawings, and a duplicate description of the same element will be omitted. However, even if the descriptions of components are omitted, such components are not intended to be included in any embodiment.

FIG. 1 is a side view illustrating a fishing rod 1000 according to an embodiment of the present disclosure.

The arrow Tip indicates the direction toward the front end (tip) of the fishing rod 1000 and the arrow Butt indicates the direction toward the rear end (butt) of the fishing rod. The fishing rod 1000 may be composed of a tubular rod 1100 including a single rod or multiple of section rods. The fishing rod 1000 has a reel seat 1200 configured to attach a reel thereon, near the rear end thereof. The fishing rod 1000 has a fishing line guide 1 that is attached to a part of the tubular rod 1100 to guide a fishing line. The fishing rod 1000 has at least one of the fishing line guides 1 of the embodiment described below as the fishing line guide thereof. Hereinbelow, the fishing line guide 1 may be referred to as a "thread-wound guide".

Figure 2:
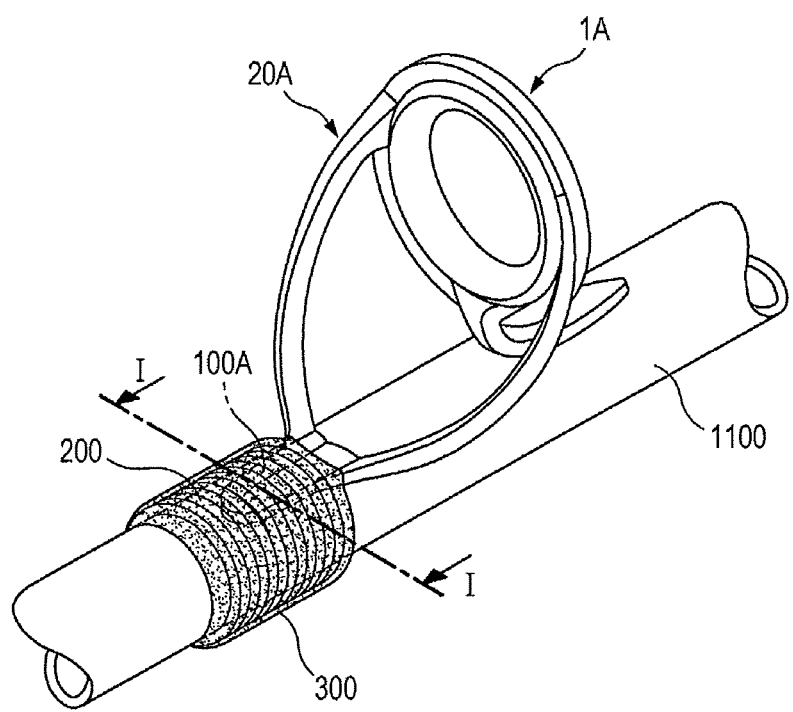
FIG. 2 is a perspective view for explaining a process in which a fishing line guide according to a comparative example is installed on a tubular rod.

FIG. 2 is a perspective view for explaining a process in which a fishing line guide 1A according to a comparative example is installed on the tubular rod 1100.

The fishing line guide 1A according to the comparative example is disposed at a proper position on the tubular rod 1100, then a thread 200 is wound around the attachment food 100A as well as the tubular rod 1100 in order to withstand load applied in the forward and rearward, leftward and right, upward and downward, and torsional directions through the fishing line, and then the fishing ling guide 1A may be fixed using an adhesive 300 such as epoxy to ensure a sufficient strength.

Meanwhile, the shape of the attachment foot 100A may be designed to have a predetermined width and thickness in order to have a strength required for withstanding the above-described load. However, when the fishing line guide is designed in consideration of the required strength, bulkiness is caused at the corner portions of the attachment foot 100A. Thus, when the thread 200 is wound to the attachment foot 100A with the tubular rod 1100, it may be difficult to achieve a sense of unity with the tubular rod 1100. That is, it may not fully meet the requirements in terms of smooth appearance.

Figure 3B:
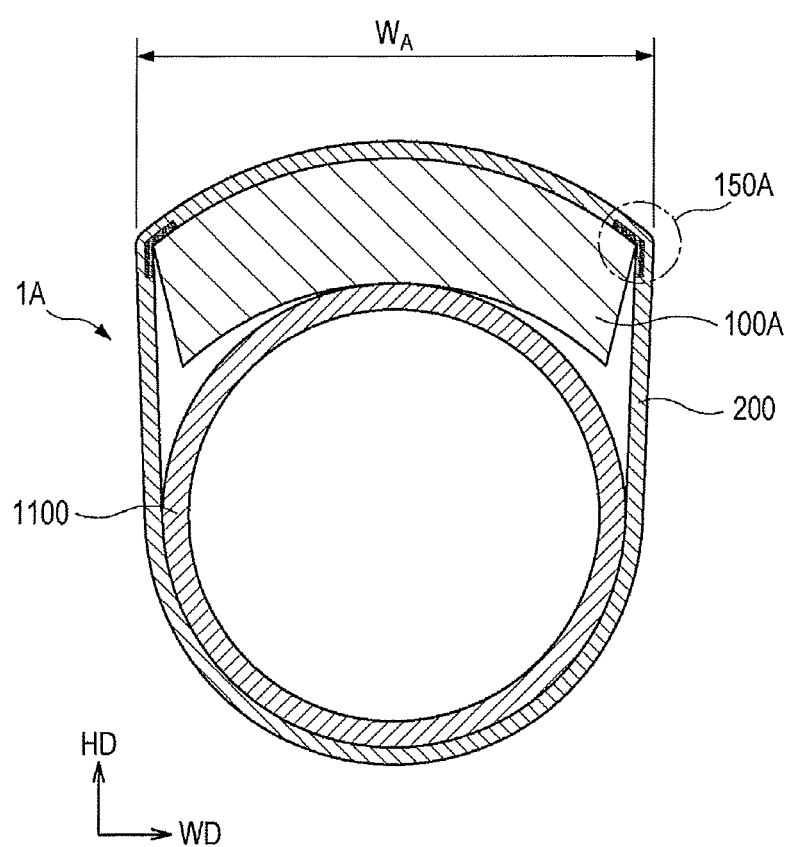
FIG. 3B is a cross-sectional view illustrating a fishing line guide according to a comparative example in the state of being installed on a tubular rod.

FIGS. 3A and 3B are cross-sectional views illustrating a fishing line guide 1A according to a comparative example in the state of being installed on the tubular rod 1100. FIGS. 3A and 3B illustrate cross sections of the fishing rod taken along line I-I in FIG. 2.

In the fishing line guide 1A according to the comparative example, the width of the attachment foot 100A is designed to be wide. The upper surface 101A and the lower surface 102A of the attachment foot 100A are formed in curved surfaces substantially similar to the outer peripheral surface of the tubular rod 1100 and the opposite side surfaces 103A thereof are formed in flat surfaces. Therefore, bent shoulder portions 150A are formed between the upper surface 101A and opposite side surfaces 103A of the attachment foot 100A. Referring to FIG. 3A, the width $W_A$ of the upper surface 101A of the attachment foot 100A has a considerably wide size so as to approach the diameter of the tubular rod 1100.

Referring to FIG. 3A, since the width $W_A$ of the upper surface 101A is formed to be wide on the tubular rod 1100, the shoulder portions 150A of the attachment foot 100A bulges to make the edges prominent, which may spoil the smooth appearance in the state in which the thread 200 is wound. Referring to FIG. 3B, the fishing line guide 1A may be installed at a position near the middle or tip of the tubular rod 1100 which is relatively small in diameter. At this position, the width $W_A$ of the upper surface 101A of the attachment foot 100A is relatively larger than the diameter of the tubular rod 1100, and thus the edges may become more prominent due to bulging of the shoulder portions 150A.

Figure 4:
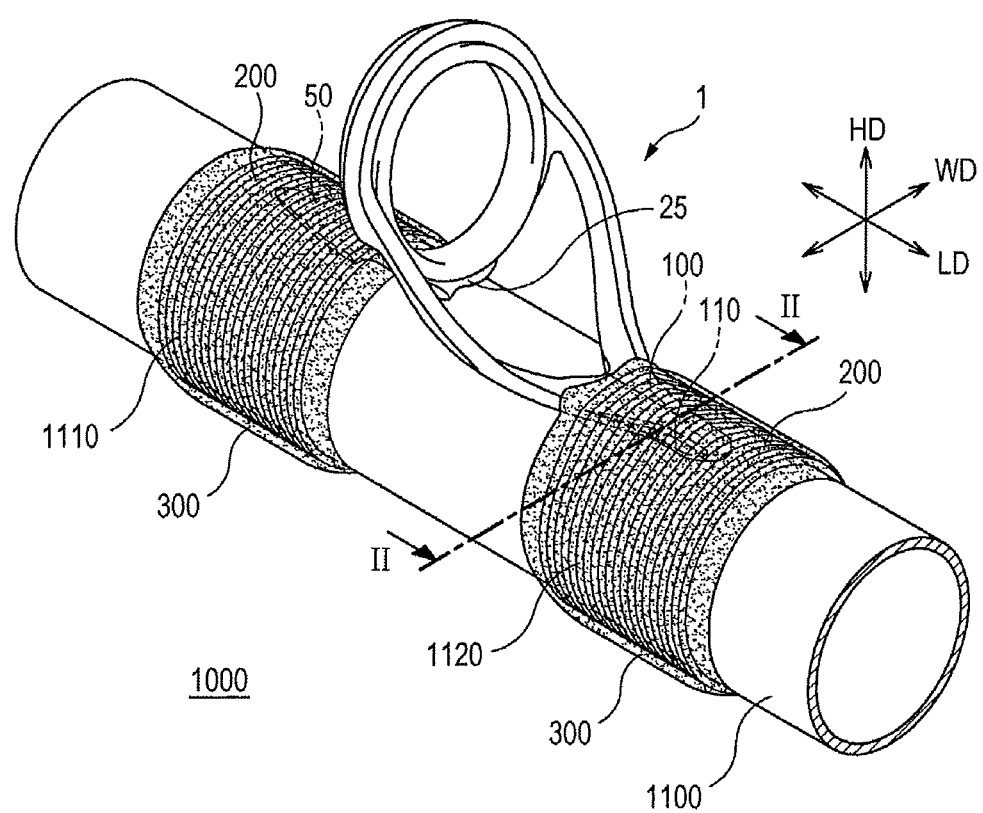
FIG. 4 is a perspective view illustrating a fishing rod on which a fishing line guide according to an embodiment of the present disclosure is installed.

FIG. 4 is a perspective view illustrating a fishing rod 1000 on which a fishing line guide 1 according to an embodiment of the present disclosure is installed.

Referring to FIG. 4, the fishing line guide 1 may be referred to as a double-foot fishing line guide having two attachment feet 50 and 100. Second and first attachment feet 50 and 100 may extend in opposite directions to each other. Referring to FIG. 4, a stepped portion 110 is formed on the first attachment foot 100. In another embodiment, a stepped portion may be formed on the second attachment foot 50 as well.

The fishing line guide 1 may be installed on the tubular rod 1100 in the following manner. First, the lower surfaces of the first and second attachment foots 50 and 100 are brought into close contact with the outer peripheral surface of the tubular rod 1100. Next, a thread 200 is wound around the first attachment foot 100 and the first outer peripheral surface portion 1120 of the tubular rod 1100 adjacent thereto. In addition, another thread 200 is wound around the second attachment foot 50 and the second outer peripheral surface portion 1110 of the tubular rod 1100 adjacent thereto. Next, when a sufficient amount of an adhesive 300 is applied to permeate into the threads 200 and then the adhesive 300 is hardened, the fishing line guide 1 can be fixed at a predetermined position of the tubular rod 1100.

Figure 5A:
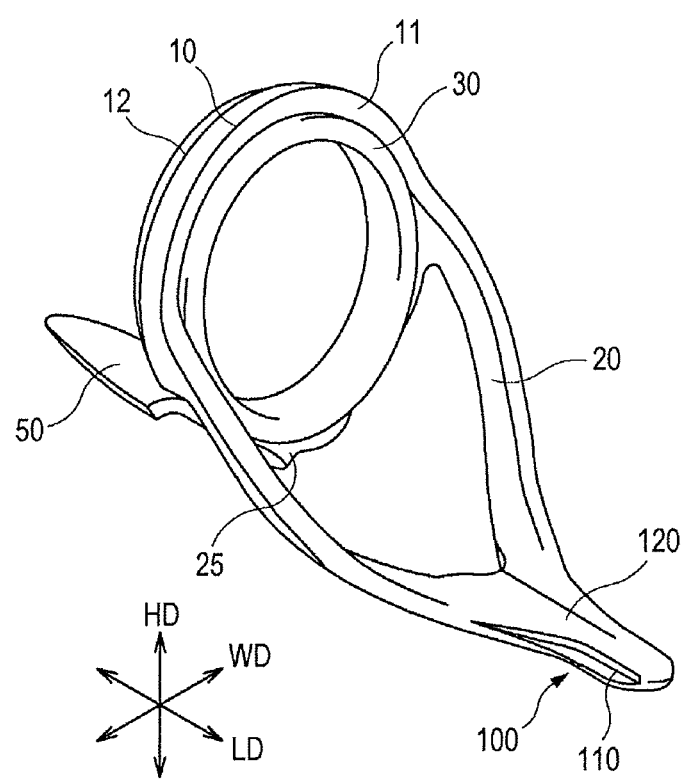
FIGS. 5A to 5E are views illustrating the configuration of a fishing line guide according to an embodiment of the present disclosure.
Figure 5B:
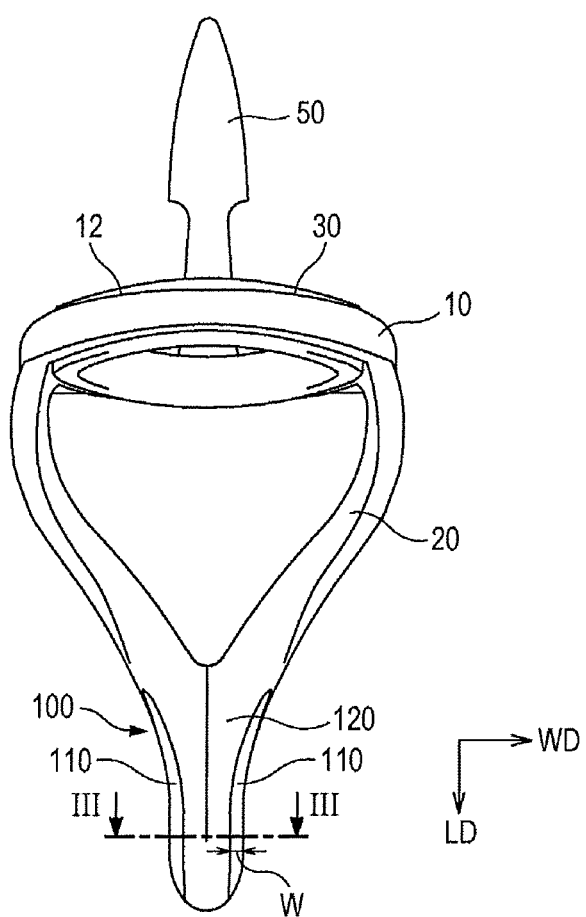
Figure 5C:
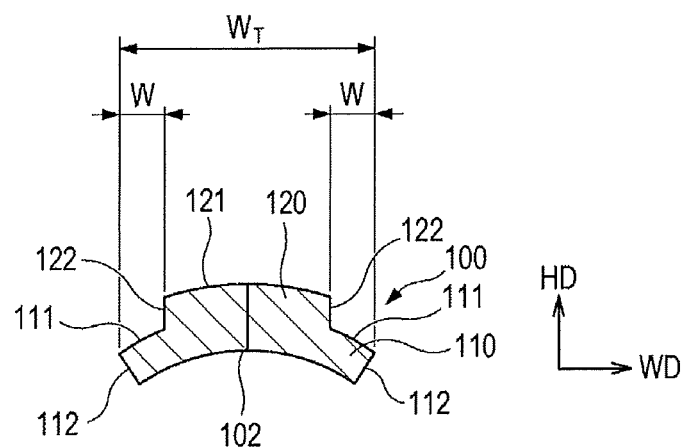
Figure 5D:
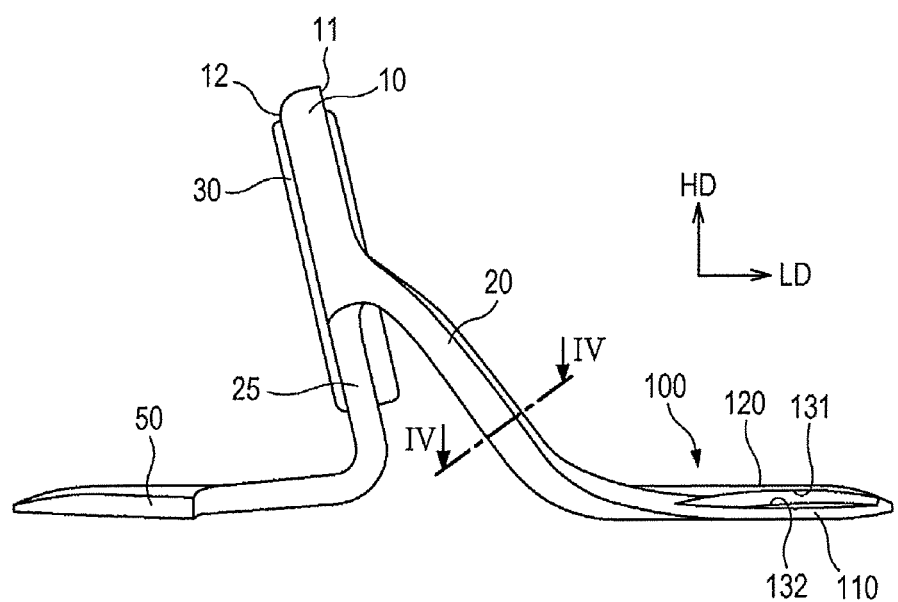
Figure 5E:
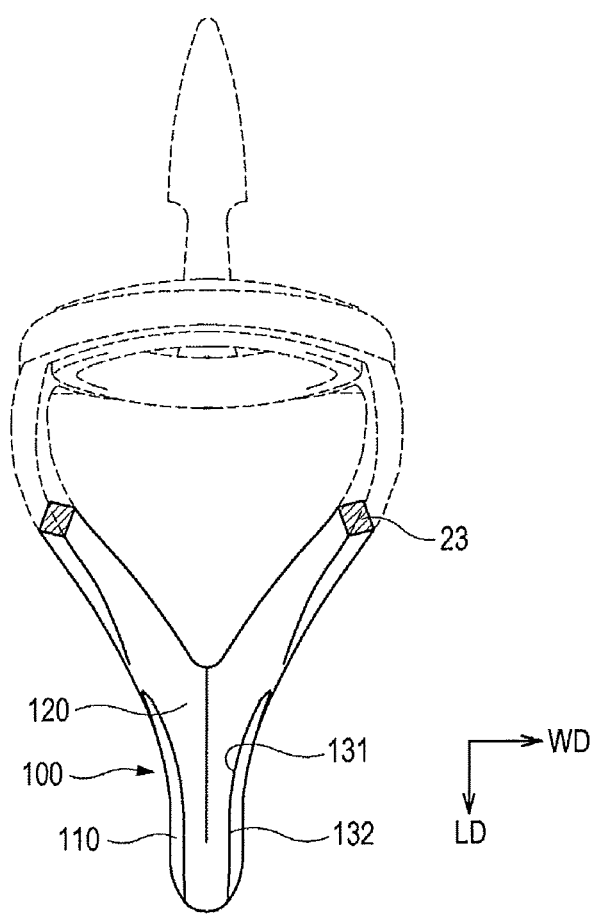

FIGS. 5A to 5E are views illustrating the configuration of a fishing line guide 1 according to an embodiment of the present disclosure. FIG. 5A illustrates a perspective view of the fishing line guide 1. FIG. 5B illustrates a top view of the fishing line guide 1. FIG. 5C illustrates a cross-sectional view of the attachment foot 100 taken along line in FIG. 5B. FIG. 5D illustrates a side view of the fishing line guide 1. FIG. 5E is a top view of the support leg 20 in which a cross section taken along line IV-IV in FIG. 5D is shown.

Referring to FIG. 5A, the fishing line guide 1 may include a ring portion 10 through which a fishing line passes and a first attachment foot 100 extending therefrom. For example, a guide ring 30 may be fitted to the ring portion 10. The fishing line guide 1 may further include a first support leg 20 extending downward from the rear surface 11 of the ring portion 10. In this case, the first attachment foot 100 may extend from the first support leg 20 in the longitudinal direction LD.

The fishing line guide 1 may further include a second support leg 25 extending from the front surface 12 of the ring portion 10 in a direction opposite the first support leg 20, and a second attachment foot 50 formed at the tip of the second support leg 25. Each part of the fishing line guide 1 except for the guide ring 30 may be formed of a metal sheet. The first attachment foot 100 may be referred to below as the "attachment foot 100".

The guide ring 30 is circular, and may have a circular opening through which the fishing line passes. The guide ring 30 is in contact with the fishing line on the surface thereof, and may be made of a hard material such as ceramic. The ring portion 10 has a ring shape in which a circular opening is formed so as to hold the guide ring 30 over the entire outer peripheral surface thereof. The guide ring 30 is fitted to the inner peripheral surface of the ring portion 10 on the outer peripheral surface thereof.

Referring to FIGS. 5A and 5B, the attachment foot 100 may have stepped portions 110 respectively formed on the opposite side portions thereof in the longitudinal direction thereof. The stepped portions 110 may be formed on the opposite side portions of the cross section in the width direction WD perpendicular to the longitudinal direction LD of the attachment foot 100. The stepped portions 110 may be formed symmetrically on the opposite side portions of the attachment foot 100. That is, the stepped portions 110 may be formed on the opposite side portions of the attachment foot 100 with the central portion 120 of the attachment foot 100 interposed therebetween.

Referring to FIG. 5B, the stepped portion 110 may have a shape corresponding to the shape of the side portions of the attachment foot 100. The stepped portions 110 may have a shape in which the stepped portions 110 extend parallel to the longitudinal direction LD from the tip of the attachment foot 100 and are spaced apart from each other in the portion connected to the support legs 20. In addition, the width W of the stepped portions 110 may vary in the longitudinal direction of the attachment foot 100. That is, the width W of the stepped portions 110 may expand from the tip to the middle portion of the attachment foot 100, and may be narrowed again in the portion connected to the support legs 20.

Line III-III in FIG. 5B is indicated in a portion where the width W of the stepped portions 110 is the largest in the attachment foot 100. Referring to FIG. 5C, the cross section of the attachment foot 100 may have an inverted 'T' shape. The stepped portions 110 may be formed to be lowered while being bent from the central portion 120.

Referring to FIG. 5C, the upper surface 111 of the stepped portion 110 may have a lower height with respect to the height direction HD compared with the upper surface 121 of the central portion 120. The side surfaces 122 of the central portion 120 may be formed to connect the upper surfaces 111 of the stepped portions 110 and the upper surface 121 of the central portion 120. The side surfaces 122 of the central portion 120 may be formed substantially parallel to the height direction HD. Unlike this, the side surfaces 112 of the stepped portions 110 may be formed to be inclined at a predetermined angle with respect to the height direction HD.

The upper surface 121 of the central portion 120 may have a generally curved shape, and the lower surfaces 102 of the stepped portions 110 may have a generally curved shape. In addition, the upper surfaces 111 of the stepped portions 110 may also have a generally curved shape. The lower surfaces 102 of the stepped portions 110 may have a radius of curvature corresponding to the diameter of a predetermined portion of the tubular rod 1100 so as to be in close contact with the tubular rod 1100.

Referring to FIGS. 5D and 5E, the first and second work-hardened portions 131 and 132 may be formed in the process of forming the stepped portions 110 in the attachment foot 100. The stepped portions 110 may be formed by an indenting process, which may be performed until at least a part of a metal material constituting the stepped portions 110 is work-hardened. First work-hardened portions 131 may be formed at the upper edges of the central portion 120 and the second work-hardened portions 132 may be formed at edge portions where the stepped portions 110 start. The first and second work-hardened portions 131 and 132 may be formed in the longitudinal direction LD of the stepped portions 110 and have a yield stress or a proof stress higher than that of the other portions. Thus, the strength of the attachment foot 100 can be further improved.

Referring to FIG. 5D, the first support leg 20 may extend downward starting from the middle portion of the rear surface 11 of the ring portion 10 with respect to the height direction HD. Therefore, the first support leg 20 may have a shape that is gently inclined with respect to the longitudinal direction LD. Unlike this, the second support leg 25 may extend downward starting from the lower portion of the ring portion 10 with respect to the height direction HD. In addition, the second support leg 25 and the second attachment foot 50 may form an angle of less than 90 degrees.

Referring to FIG. 5E, the cross section 23 of the first support leg 20 may have a rectangular shape. In this case, the rigidity of the support leg 20 can be enhanced compared with the case in which the support leg 20 has another cross-sectional shape. The first support leg 20 may extend in two sections from the opposite side portions of the ring portion 10 with respect to the width direction. The two sections of the first support leg 20 may be joined at a point where the first support leg 20 is connected to the attachment foot 100.

Figure 6:
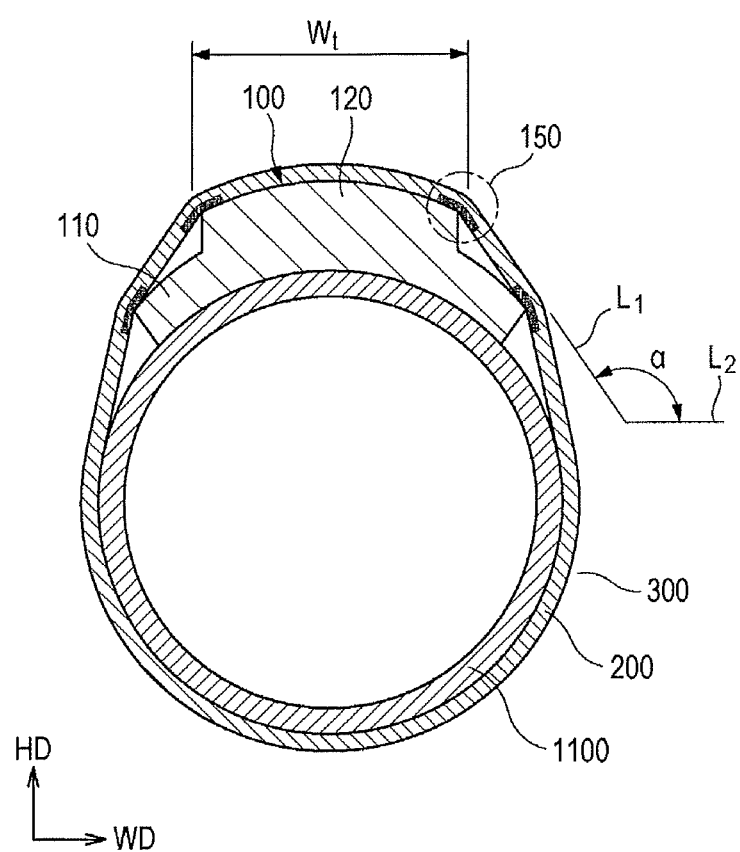
FIG. 6 is a cross-sectional view taken along line II-II in FIG. 4, illustrating an attachment foot portion of a fishing line guide.

FIG. 6 is a cross-sectional view taken along line II-II in FIG. 4, illustrating the attachment foot 100 portion of the fishing line guide 1 illustrated in FIG. 4. In FIG. 6, illustration of the adhesive 300 is omitted for convenience of explanation. Hereinafter, the fishing line guide 1 will be described in comparison with the fishing line guide 1A shown in FIG. 3A.

In the fishing line guide 1 according to an embodiment, bulging in the width $W_T$ of the central portion 120 and prominence of shoulder portions 150 in the attachment foot 100 may be suppressed compared to the fishing line guide 1 according to the fishing line guide 1A. As described above, since the work-hardened portions are formed in the attachment foot 100, the strength can be improved. In the attachment foot 100 according to an embodiment, the bulging in the width $W_T$ of the central portion 120 is smaller than that in the width $W_A$ of the upper surface 101A of the fishing line guide 1A according to the comparative example, and the shoulder portions 150 are not prominent. The angle α between a line $L_1$ extending from each side of the thread 200 surrounding the stepped portions 110 and a line $L_2$ parallel to the width direction WD is obtuse, so that a gentle slope can be formed.

Figure 7:
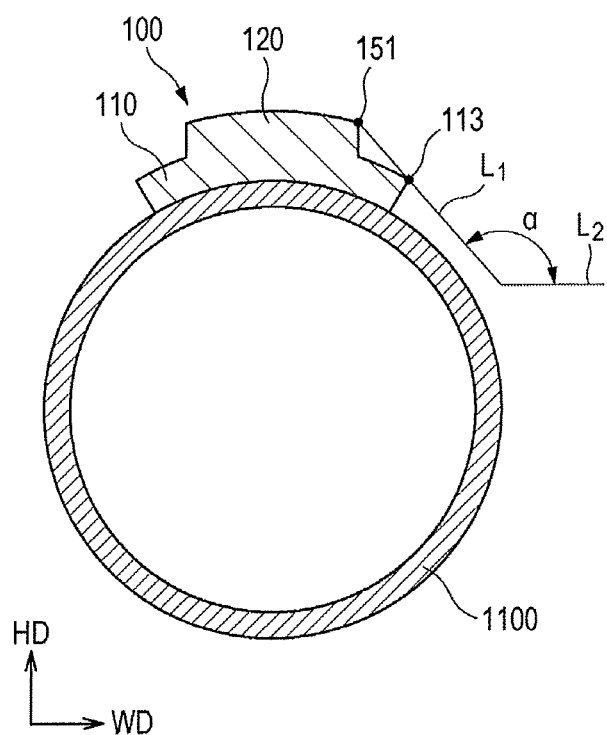
FIG. 7 is a cross-sectional view illustrating the attachment foot and the tubular rod illustrated in FIG. 6.

FIG. 7 is a cross-sectional view illustrating the attachment foot 100 and the tubular rod 1100 illustrated in FIG. 6.

The angle α between the line $L_1$ connecting an edge 151 of the central portion 120 of the attachment foot 100 and an edge 113 of a stepped portion 110 and the line $L_2$ parallel to the width direction WD may be in the range of 110 degrees to 150 degrees. The angle α may be the same as the angle formed by the thread 200 as illustrated in FIG. 6.

The gentle gradient range of the angle α shown in FIGS. 6 and 7 applied in accordance with an embodiment of the present disclosure may be in the range of 110 degrees to 150 degrees, which makes it possible to achieve smooth appearance in the edge portions on which the thread 200 is wound. When the angle α shown in FIGS. 6 and 7 deviates from the above-mentioned range, it may deviate from a practical effective range.

Figure 8A:
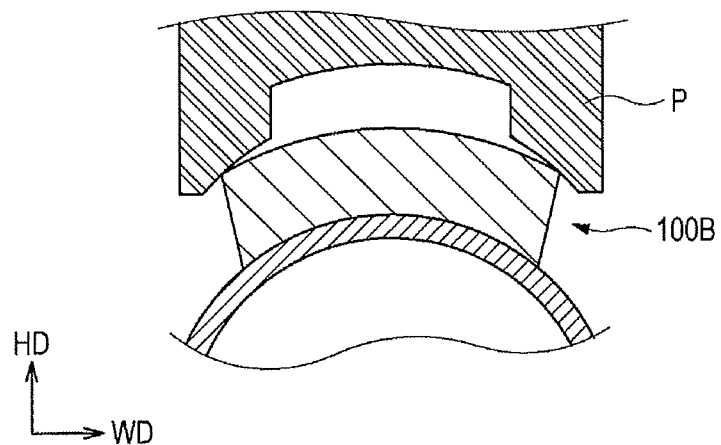
Figure 8B:
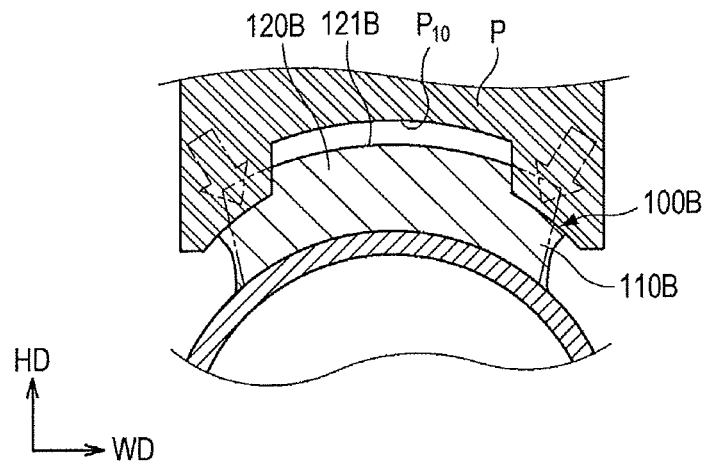

FIGS. 8A to 8C are process views illustrating a process of forming stepped portions 110 on an attachment foot 100 of a fishing line guide 1 according to an embodiment of the present disclosure.

The stepped portions 110 may be formed by an indenting process. The indenting process may be referred to as a "crushing process" in another expression. The indenting process may mean a process of crushing at least a part of a preform shape 100B of the attachment foot 100 by pressing the part using a press P having a predetermined shape. The indenting process may proceed in the order illustrated in FIGS. 8A to 8C. The two-dot chain lines indicated in FIGS. 8B and 8C illustrate the preform shape 100B.

The stepped portions 110 may be provided on the opposite upper portions of the preform shape 100B of the attachment foot 100 by performing the indenting process using the press P. After the stepped portions 110 are formed on the attachment foot 100 by the indenting process, and the winding of the thread 200 is completed, the outer appearance of the attachment foot may have a gentle slope (inclination) and have edges, which are not prominent, which may ensure satisfactory smooth appearance requirements.

An indenting process for forming the stepped portions 110 will be described below. Referring to FIG. 8A, first, the press P is aligned on the upper side of the preform shape 100B of the attachment foot 100 before being processed. Next, referring to FIG. 8B, the opposite side portions 110B of the preform shape 100B are crushed while moving the press P downward in the course of being processed. In this process, as the opposite side portions 110B are pressed by the press P in the direction indicated by arrows (indicated by one-dot chain lines), the height in the height direction HD is lowered and the length is increased in the width direction WD. Thereafter, the pressing of the press P is continued until the inner surface $P_{10}$ of the press P and the upper surface 121B of the central portion 120B of the preform shape 100B come into contact with each other. Through this process, referring to FIG. 8C, formation of the stepped portions 110 in the attachment foot 100 may be completed. Referring to FIGS. 8A and 8C, it is possible to compare shapes of the preform shape 100B, which does not have stepped portions before processed and the attachment foot 100 having the stepped portions 110 formed after processed.

In this way, the stepped portions 110 extending in the width direction WD may be formed through the indenting process so as to correspond to the portions the height of which is decreased from the material of the preform shape 100B before processed. As described above, the work-hardened portions can be formed in the stepped portions 110 through the indenting process, whereby the strength and rigidity of the attachment foot 100 can be improved.

FIG. 9 is a cross-sectional view for explaining the detailed configuration of an attachment foot 100 of a fishing line guide 1 according to an embodiment of the present disclosure. A practical effective range of the stepped portion 110 may be described with reference to FIG. 9.

The width W of one stepped portion 110 (that is, the stepped portion 110 formed on one side in the width direction WD of the attachment foot 100) may be 15 to 22.5% of the total width $W_T$ of the attachment foot 100 with reference to the width direction WD. That is, the indented width W of one stepped portion 110 extending in the width direction WD through the indenting process may have a size of 15 to 22.5% of the total width $W_T$ of the attachment foot 100.

The indented depth D in the attachment foot 100 may be 30 to 50% of the thickness T at the center position of the central portion 120 in the width direction WD of the attachment 100 with reference to the height direction HD in the cross section of the attachment foot 100 in the width direction. The thickness T may be defined as the shortest distance between the center point $C_1$ of the upper surface 121 of the central portion 120 in the width direction WD and the center point C2 of the lower surface 102 of the attachment foot 100 in the width direction WD. That is, the indented depth D of the stepped portions 110 to be pressed in the height direction HD by the indenting process may have the size of 30 to 50% of the thickness T at the center position of the central portion 120 of the attachment foot 100.

When the stepped portions 110 according to the embodiment of the present disclosure is formed on the attachment foot 100, it is possible to make the gradient gentle after winding the thread 200, and to enhance the strength of the attachment foot 100.

Hereinafter, the optimum configuration of the stepped portions 110 will be described. The indented width W of one stepped portion may form an optimum embodiment (i.e., a practical peak value) when the indented width W of one stepped portion 110 is 22.5% of the total width $W_T$ of the attachment foot 100. In addition, the indented depth D may form an optimum embodiment (i.e., a practical peak value) when the indented depth D is 50% of the maximum thickness T of the attachment foot 100. When the width of one stepped portion 110 is 22.5% of the total width $W_T$, the total indented width 2W (i.e., the total sum of the widths W the two stepped portions 110 formed on the opposite side portions of the attachment foot 100) may be 45% of the total width $W_T$ which is twice the one stepped portion 110.

FIG. 10 shows test data for explaining an improvement rate in the strength of an attachment foot 100 after an indenting process is performed on the attachment foot 100. In the table of FIG. 10, the first row represents the total indented width 2W corresponding thereto, and the first column represents the indented depth D corresponding thereto. For example, 104.1% shown in the sixth row and the third column corresponds to a case in which the total indented width 2W is 45% of the total width $W_T$ and the indented depth D is 50% of the maximum thickness T.

Figure 11:
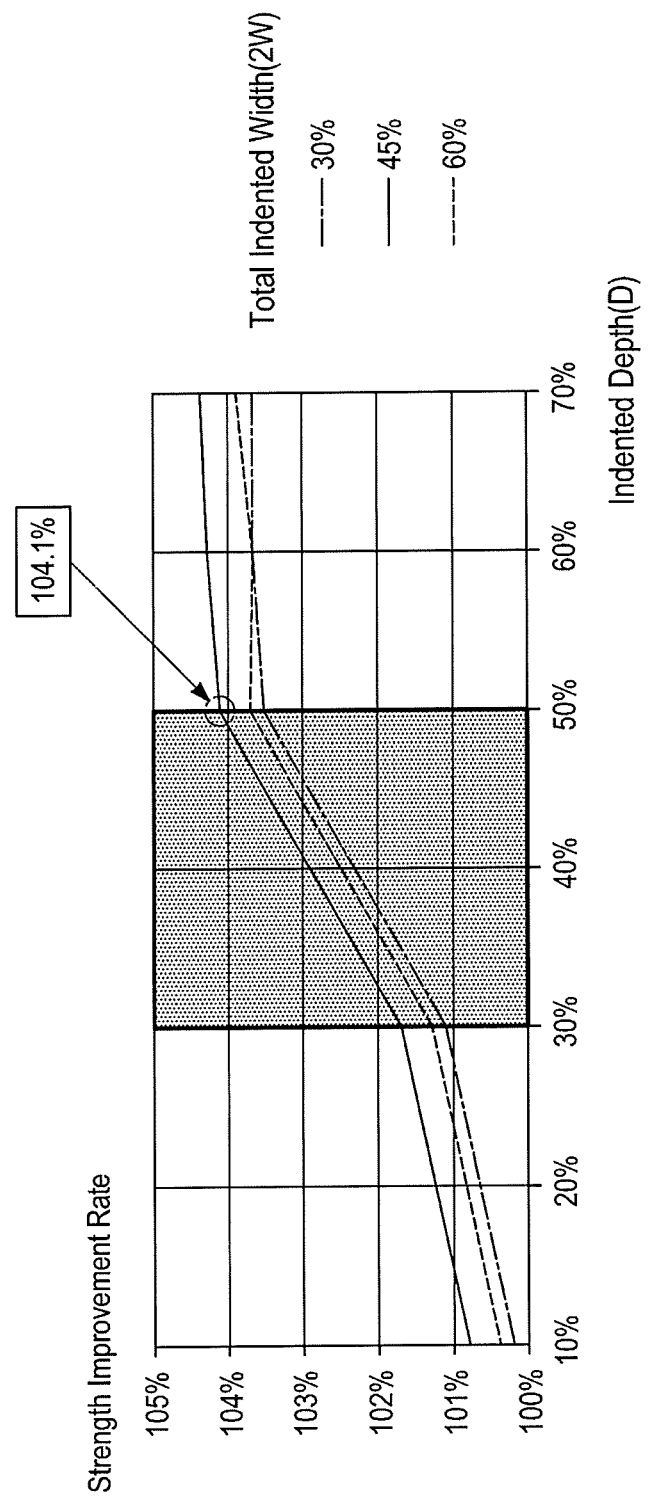
FIG. 11 is a graph for explaining an improvement rate in the strength of an attachment foot after an indenting process is performed thereon.

FIG. 11 is a graph for explaining an improvement rate in the strength of an attachment foot 100 after an indenting process is performed thereon. In the graph illustrated in FIG. 11, the X-axis represents the indented depth D, and the Y-axis represents the improvement rate in the strength of an attachment foot 100.

Referring to FIG. 11, it can be understood that when the indented depth D of the stepped portions 110 is in the range of 30 to 50%, it is in a practical effective range. In addition, referring to FIG. 11, although the strength may be slightly improved in the range of 0.2 to 0.3% even if the indented depth D of the attachment foot 100 is 50% or more, the indented depth D up to 50% may be the practical effective range in order to reduce defects in the pressing process and to improve the productivity.

Referring to the graph illustrated in FIG. 11, it can be seen that the strength of the attachment foot 100 obtained when the total indented width 2W is 45% is higher than that obtained when the total indented width 2W is 30% or 60%. In addition, when the indented depth D is 50%, the strength of the attachment foot 100 may be a practical peak value of 104.1%.

FIG. 12 is a view for explaining the boundaries $B_{P1}$ and $B_{P2}$ at which the attachment feet 100C and 100D of the fishing line guides 1C and 1D according to the comparative example start. Hereinafter, thread-winding stop marks between the attachment foot 100 and the support legs 20C and 20D will be described.

Figure 12B:
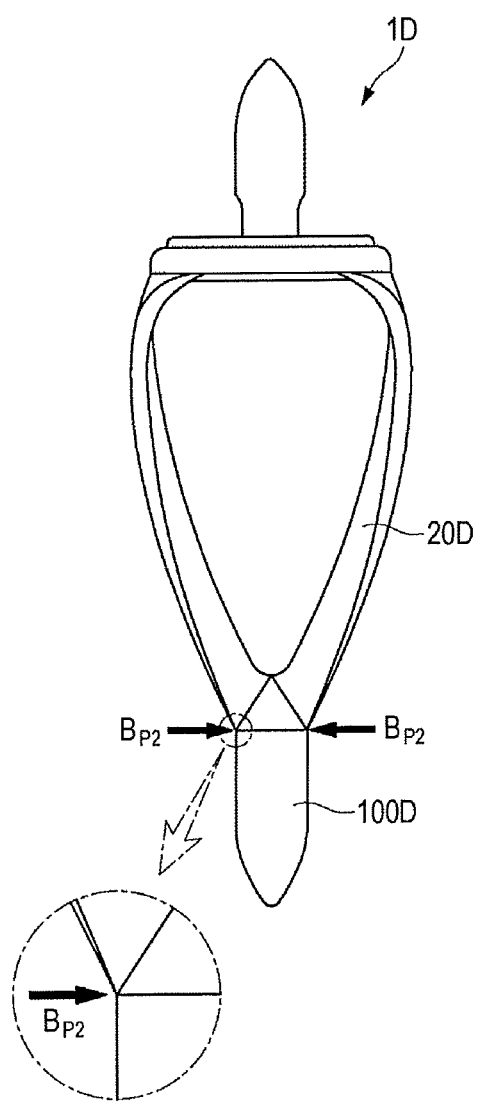

FIGS. 12A and 12B illustrate fishing line guides 1C and 1D having different shapes. Stepped portions are not formed on the attachment feet 100C and 100D. The attachment feet 100C and 100D of the fishing line guides 1C and 1D may be fixed using an adhesive 300 such as epoxy in the state of winding the threads 200 around the attachment feet 100C and 100D and the tubular rod 1100. The winding of the threads 200 may be started from the front side portions of the tips of the attachment feet 100C and 100D, and may be completed at the boundaries $B_{P1}$ and $B_{P2}$ between the attachment feet 100C and 100D and the support legs 20C and 20D.

For example, the fishing line guide 1C or 1D may have a shape in which the support legs thereof are considerably laid down in the longitudinal direction thereof. When the marks indicating the boundaries $B_{P1}$ and $B_{P2}$ are not clearly indicated, an operator may wind the threads even around the support legs beyond the attachment foot, and in such a case, a problem that the support legs are deformed or the like may occur.

Accordingly, the design of the support legs 20C and 20D may be limited in order to clearly indicate the boundaries $B_{P1}$ and $B_{P2}$, and it may be necessary to form boundary lines on the upper portions of the attachment feet 100C and 100D in the pressing process. Meanwhile, stresses are concentrated to the portion of the attachment foot 100C or 100D in which the thread 200 is wound around the support leg 20C or 20D, and in view of the structure, cracks are likely to occur in the portion, and it may be undesirable to form boundary lines at the boundaries $B_{P1}$ or $B_{P2}$ between the attachment foot 100C or 100D and the support legs 20C or 20D.

High quality can be achieved only when the thread 200 is wound to a stable length in the process of winding the thread 200. However, unless a boundary (a split position) is clearly indicated in the attachment foot 100C or 100D, an operator may not uniformly determine the position at which the winding operation is completed, and deterioration of smooth appearance due to excessive winding or reduction of fixing force due to insufficient winding may be caused. Therefore, it is necessary to form a boundary (a split position) at an appropriate position in an appropriate manner.

Figure 13A:
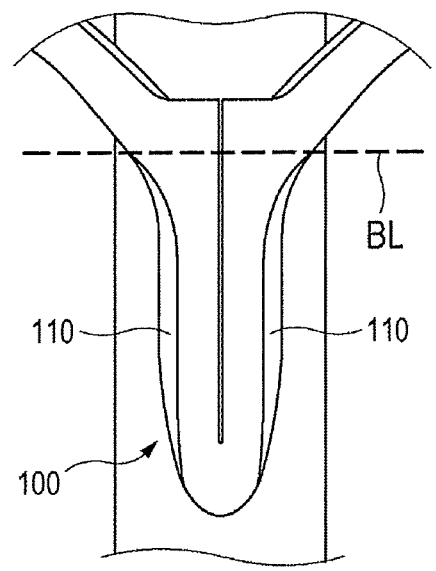
FIGS. 13A and 13B are top views for explaining the position of a boundary from which an attachment foot starts in a fishing line guide according to an embodiment of the present disclosure.
Figure 13B:
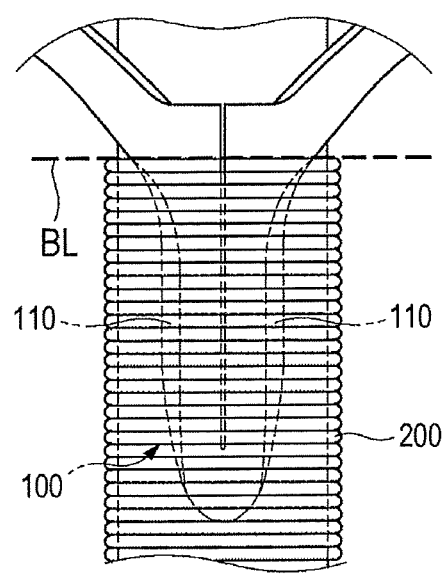

FIGS. 13A and 13B are top views for explaining the position of a boundary from which an attachment foot 100 starts in a fishing line guide 1 according to an embodiment of the present disclosure.

It is possible to provide the stepped portions 110 by performing an indenting process on the upper surfaces of the opposite side portions of the attachment foot 100 according to an embodiment using a press. In this case, the starting point of the stepped portions 110 may be the boundary line BL where the winding is completed, and the boundary between the attachment foot 100 and the support leg 20 may be clearly indicated.

Since the stepped portions 110 are formed on the attachment foot 100 by the above-described indenting process, the boundary (the split position) becomes clear, and the completed position for finishing the winding of the thread 200 may be made constant in a convenient manner for the user. In addition, it is possible to prevent the deterioration of smooth appearance due to excessive winding and the reduction of fixing force due to insufficient winding of the thread 200.

Figure 14:
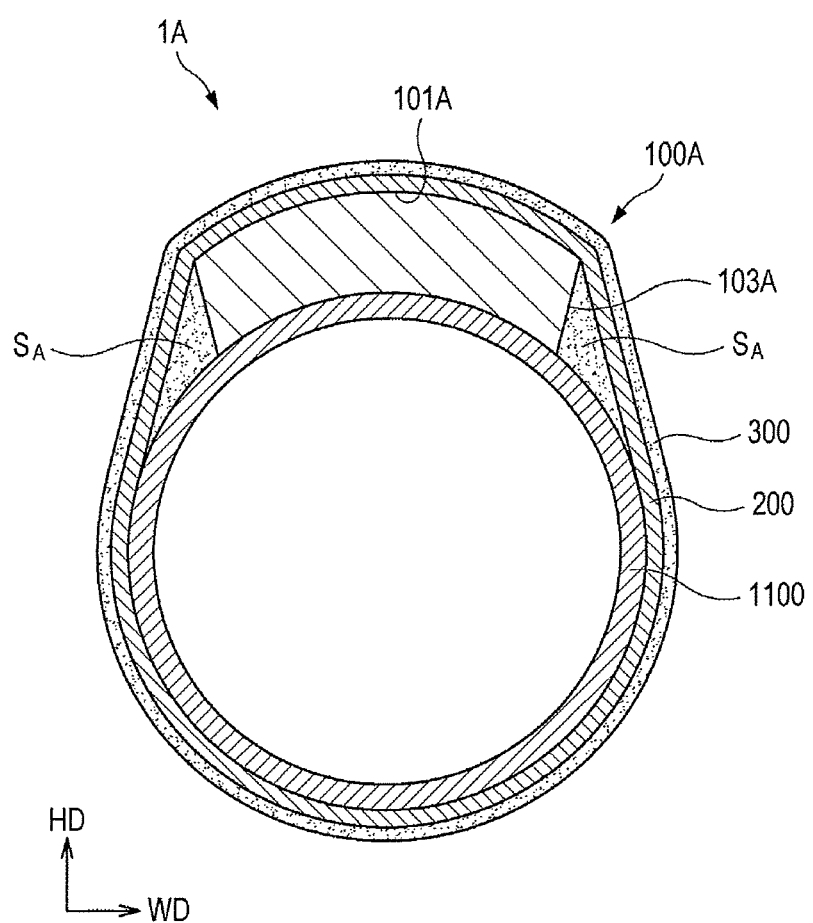
FIG. 14 is a cross-sectional view for explaining the state in which an adhesive penetrates into a thread wound around a fishing line guide according to a comparative example.

FIG. 14 is a cross-sectional view for explaining the state in which an adhesive 300 permeates into a space formed by a thread 200 wound around a fishing line guide 1A according to a comparative example.

The fishing line guide 1A may be fixed with a sufficient strength using an adhesive 300 such as epoxy in the state in which a thread is wound around the attachment foot 100A. When the adhesive 300 is applied, the adhesive 300 is usually applied thinly in order to reduce the deviation and unevenness of the adhesive 300 on the surface coated with the adhesive 300. However, when the adhesive 300 is thinly applied, the bonding force may be affected thereby and the expansion and contraction of the adhesive 300 may be repeated due to the warping of the fishing rod. As a result, the adhesive 300 may be whitened or cracked, and the aesthetic property of the fishing rod may be damaged.

In order to prevent the adhesive 300 from being whitened or cracked, various studies on bonding processes are underway so as to allow a large amount of the adhesive 300 to permeate into a space surrounded by the thread 200. In the bonding process, due to a process deviation which means that the degree to which the adhesive 300 is applied varies, the amount of the adhesive 300 to permeate into the space surrounded by the thread 200 may be insufficient, which may result in lack of bonding force. In addition, a material for the thread, use of an adhesive having a high viscosity, and the like may be considered as causes of insufficient permeation of the adhesive 300, and even in the presence of such inhibiting factors, it is necessary to enhance the probability of causing the adhesive to permeate into the inner space formed by the thread.

Figure 15:
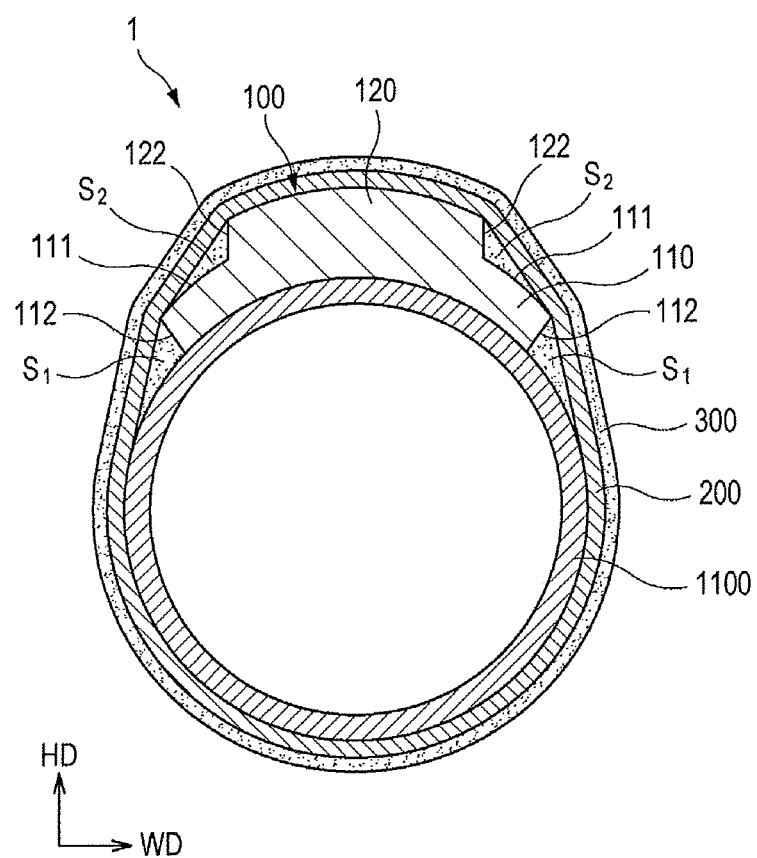
FIG. 15 is a cross-sectional view for explaining the state in which an adhesive penetrates into a thread wound around a fishing line guide according to an embodiment of the present disclosure.

FIG. 15 is a cross-sectional view for explaining the state in which an adhesive permeates into a thread wound around a fishing line guide according to an embodiment of the present disclosure. Hereinafter, a description will be given in comparison with the fishing line guide 1A illustrated in FIG. 14

Unlike the fishing line guide 1A according to the comparative example, the fishing line guide 1 according to the embodiment may be provided with the stepped portions 110 by performing an indenting process on the upper surfaces of the opposite side portions of the attachment foot 100.

The fishing line guide 1A according to the comparative example has no space in which the adhesive 300 is able to permeate between the upper surface 101A of the attachment foot 100A and the inner surface of the thread 200 wound therearound, and only the spaces $S_A$ between the side surfaces 103A of the attachment foot 100A and the inner surface of the thread 200 may be filled with the adhesive 300. Unlike the comparative example, since the attachment foot 100 of the fishing line guide 1 according to an embodiment is provided with the stepped portions 110, second spaces $S_2$ between the upper surfaces 111 of the stepped portions 110 and the inner surface of the thread 200 wound therearound and first spaces $S_1$ between the side surfaces 112 of the stepped portions 110 and the outer peripheral surface of the tubular rod 1100 and the inner surface of the thread 200 wound therearound may be filled with the adhesive 300.

Therefore, unlike the fishing line guide 1A according to the comparative example, since the portions into which the adhesive 300 is able to permeate is reduced in the fishing line guide 1 according to the embodiment, it is possible to increase the space (cross-sectional area) into which the adhesive 300 is able to permeate. In addition, it is possible to increase the area to be in contact with the thread 200 in the attachment foot 100.

Since the stepped portions 110 is formed in the fishing line guide 1 according to the embodiment, the second spaces $S_2$, which are not present in the comparative embodiment and into which the adhesive 300 is able to permeate, can be formed. Therefore, it becomes easier to make the adhesive to permeate into the inside of the thread 200. In addition, since the width of the central portion 120 of the attachment foot 100 is narrowed through the indenting process, the range in which bonding force is weak can be reduced. That is, since the new second spaces S2 are formed by the stepped portions 110, the cross-sectional area of the total space into which the adhesive 300 is able to permeate is increased, so that the bonding force can be improved.

Figures 16, 17:
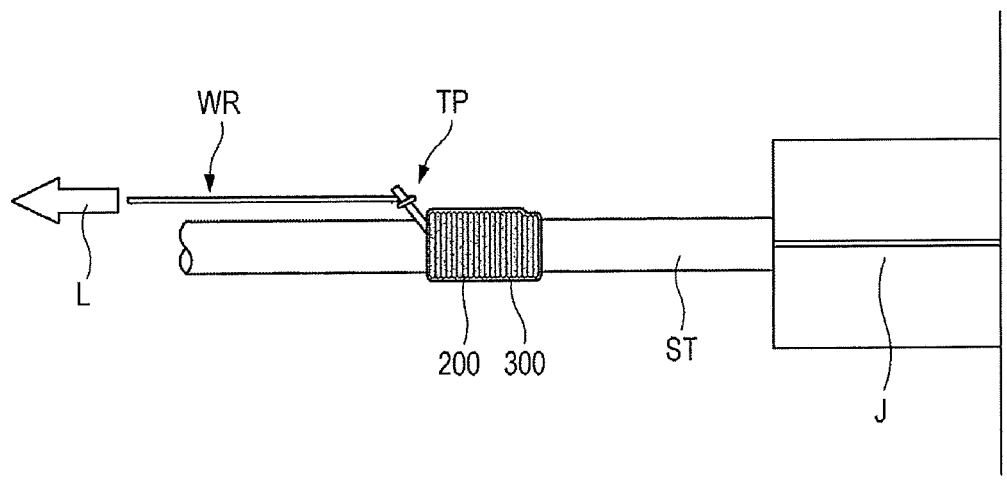
FIG. 16 is a side view for explaining a test for evaluating the extraction strength of a fishing line guide.
FIG. 17 is a view for explaining test pieces used in the test of FIG. 16 in comparison.

FIG. 16 is a side view for explaining a test for evaluating the extraction strength of a fishing line guide. FIG. 17 is a view for explaining test pieces TPA and TP1 used in the test of FIG. 16 in comparison.

Through the test described with reference to FIG. 16, it can be confirmed whether or not there is a difference in extraction strength between the attachment foot having no stepped portion and the attachment foot having stepped portions. That is, it is possible to evaluate whether or not the extraction strength of the attachment foot having stepped portions can be improved through such a test.

The test method is as follows. The test piece TP is fixed by winding a thread 200 around a verification shaft ST made of a metal as well as the test piece and coating an epoxy adhesive 300. Further, one end of a wire WR is fixed to the hole of the test piece TP in the state in which the verification shaft ST is fixed by the jig J. Next, a load tester extracts the other end of the wire WR in a direction indicated by an arrow L to perform a test. According to the test results, it is possible to compare the extraction strengths of the attachment feet.

Referring to FIG. 17, the test piece TP illustrated in FIG. 16 may include two types of test pieces TPA and TP1, which differ only in the presence or absence of the stepped portions 110. The attachment foot 100A of the test piece TPA according to the comparative example does not have stepped portions, and the attachment foot 100 of the test piece TP1 according to the embodiment is provided with the stepped portions 110. The total indented width 2W in the stepped portions 110 of the test piece TP1 according to the embodiment is 45% and the indented depth D is 50%, which is in the practical effective range.

The two types of test pieces TPA and TP1 have the same conditions in the thickness, width, and length of the attachment feet 100A and 100 (width: 5.0 mm, length: 9.0 mm). Holes 181A and 181 are formed in the bodies 180A and 180 of the two types of test pieces TPA and TP1. One end of a wire WR may be passed through each of the holes 181A and 181, and the wire WR may be connected to each of the test pieces TPA and TP1.

Referring to the fourth row of FIG. 17, it is possible to compare the difference in extraction force between the two types of test pieces TPA and TP1 (force by which the attachment feet of the test pieces are extracted from the verification shaft on which the attachment feet are fixed by the threads and the adhesive). The extraction force tested using the test piece TPA according to the comparative example is 269.97 N, and the extraction force tested using the test piece TP1 according to the embodiment is 295.02 N. Accordingly, it can be confirmed that the extraction force of the test piece TP1 according to the example is 9.28% higher than that of the test piece TPA according to the comparative example.

Figure 18:
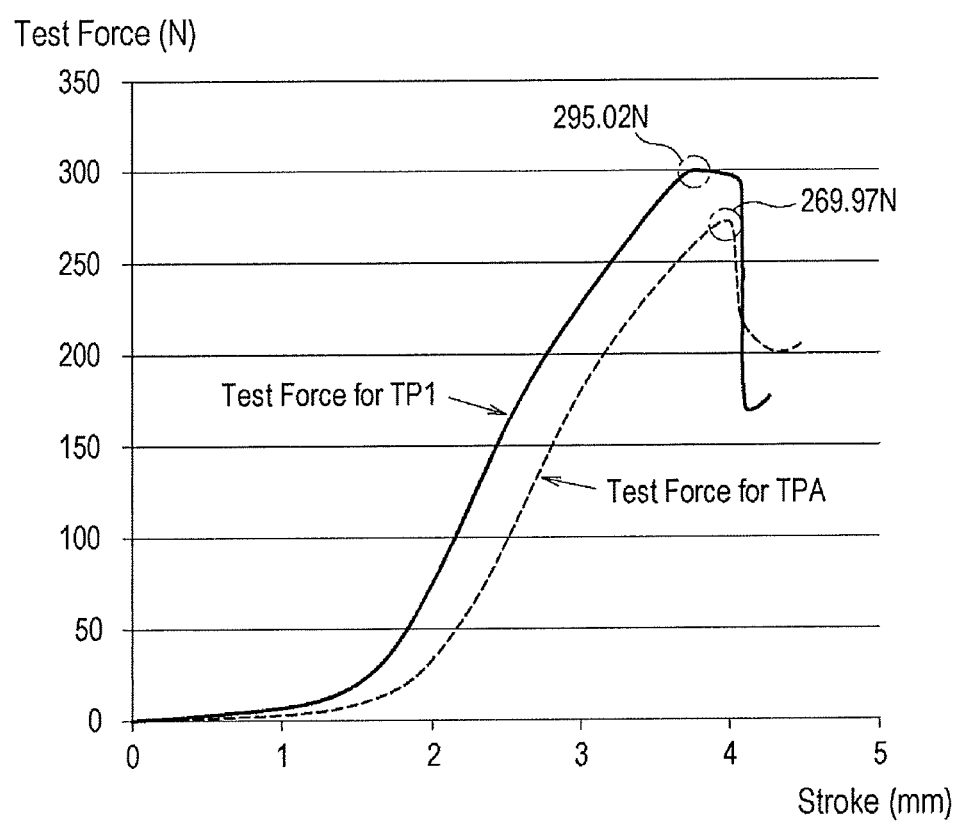
FIG. 18 is a graph showing the results of tests performed using the test pieces illustrated in FIG. 17.

FIG. 18 is a graph showing the results of tests performed using the test pieces TPA and TP1 illustrated in FIG. 17.

The X axis represents the stroke of a wire WR, and the unit of the stroke is mm. The Y axis represents the extraction force of test pieces TPA and TP1 using a wire WR, which is the test force, and the unit of the force is N. When the stroke of the wire WR increases, the test force increases due to the reaction from the thread 200 and the adhesive 300. Thereafter, since the reaction is reduced after the attachment feet are separated and extracted from the threads 200 and the adhesives 300 of the test pieces TPA and TP1, the test force is reduced.

Referring to FIG. 18, the points where the test force is greatest (test piece TPA: 269.97 N, test piece TP1: 295.02 N) may be the points where the test pieces are extracted. In addition, it can be seen that the test force for the test piece TP1 is generally larger than the test force for the test piece TPA in the region prior to the points where the test pieces are extracted.

According to the above test results, since the force by which the test piece having the stepped portions is extracted is larger than the force by which the test piece having no stepped portion is extracted, it can be confirmed that the attachment foot, which includes stepped portions, can be fixed to the tubular rod more firmly by the thread and adhesive, compared to the foot, which does not include stepped portions.

Figure 19A:
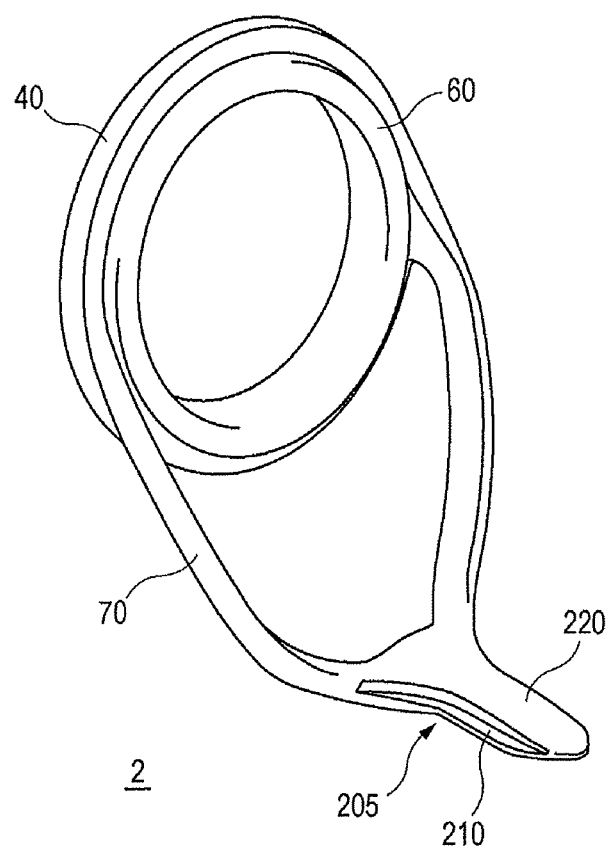
FIGS. 19A and 19B are views for explaining a fishing line guide according to another embodiment of the present disclosure.
Figure 19B:
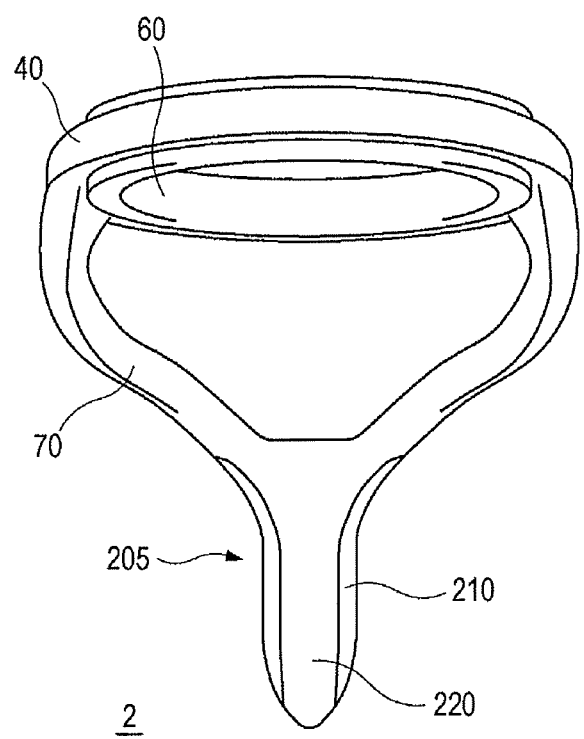

FIGS. 19A and 19B are views for explaining a fishing line guide according to another embodiment of the present disclosure.

In the above-described embodiment, double-foot fishing line guides 1 having two attachment feet have been described. The configuration of the stepped portions according to the present disclosure may also be applicable to a single-foot fishing line guide 2 having one attachment foot.

The fishing line guide 2 may include a ring portion 40 and one attachment foot 205 extending from the ring portion. In addition, the fishing line guide 2 may be provided with support legs 70 between the ring portion 40 and the attachment foot 205. A guide ring 60 may be fitted to the ring portion 40. The attachment foot 205 may have stepped portions 210 formed on the opposite side portions of the central portion 220. The stepped portions 210 may be formed by an indenting process that indents the upper surface of the attachment foot 205 using a press.

According to the embodiments of the present disclosure, in the state in which the fishing line guide is installed on the tubular rod, the edge portions of the attachment foot can be seen as aesthetically smooth. Since the indenting process is performed on the attachment foot in order to form the stepped portions, the strength and rigidity of the attachment foot can be improved. Further, since additional spaces to be applied with the adhesive are provided between the stepped portions and the winding thread, the bondability between the winding thread and the fishing line guide can be improved.

Although the present disclosure has been described in relation to some embodiments, it should be noted that there may be various modifications and changes without departing from the spirit and scope of the present disclosure, which can be understood by those skilled in the art. In addition, such modifications and changes should be construed to belong to the scope of the claims appended herein.

What is claimed is:

1. A fishing line guide comprising:
a ring portion through which a fishing line passes; and
an attachment foot extending from the ring portion and attachable to a fishing rod,
wherein the attachment foot has a stepped portion formed on each of left and right sides of a cross section of the attachment foot in a width direction, the cross section being orthogonal to a longitudinal direction of the attachment foot,
the stepped portion has a first height lower than a second height of a central portion of the attachment foot with reference to a height direction of the cross section of the attachment foot, and
the central portion has side surfaces that are parallel to the height direction.

2. The fishing line guide of claim 1, wherein the stepped portion has a width that is 15 to 22.5% of a total width of the attachment foot with reference to the width direction.

3. The fishing line guide of claim 1, further comprising a support leg that connects the ring portion and the attachment foot,
wherein the attachment foot is made of a metal material.

4. The fishing line guide of claim 1, wherein the stepped portion is formed to extend in the width direction by an indenting process that presses an upper surface portion of the attachment foot in the height direction in a state in which a lower surface portion of the attachment foot is supported, and
wherein the stepped portion has an indented depth with reference to the height direction and the indented depth is 30 to 50% of a thickness at a center position of the central portion.

5. A fishing rod comprising:
the fishing line guide of claim 1;
a tubular rod to which the fishing line guide is attached;
a winding thread configured to be wound around the attachment foot of the fishing line guide and an outer peripheral portion of the tubular rod adjacent to the attachment foot; and
an adhesive applied and hardened on the winding thread.

6. The fishing rod of claim 5, wherein a first end of the stepped portion is formed at a position adjacent to a front end of the attachment foot, and a second end of the stepped portion is formed at a position adjacent to a rear end of the attachment foot, and
the winding thread is wound until the second end of the stepped portion.

7. The fishing rod of claim 5, wherein an angle between a line connecting a first edge of the central portion and a second edge of the stepped portion, and a line parallel to the width direction is 110 degrees to 150 degrees.

8. The fishing rod of claim 5, wherein a space defined by a portion of the winding thread, a first edge of the central portion, a second edge of the stepped portion, an upper surface of the stepped portion, and the side surface of the central portion is filled with the adhesive.

* * * * *